United States Patent
Teng et al.

(10) Patent No.: US 10,291,665 B1
(45) Date of Patent: May 14, 2019

(54) INCREASING A VISIBILITY OF A CONTENT ITEM WITH A COMMENT BY A CLOSE CONTACT

(71) Applicant: Google Inc., Mountain View, CA (US)

(72) Inventors: Junbin Teng, Mountain View, CA (US); Boris Mazniker, San Francisco, CA (US); Daniel Wyatt, San Francisco, CA (US)

(73) Assignee: Google LLC, Mountain View, CA (US)

( * ) Notice: Subject to any disclaimer, the term of this patent is extended or adjusted under 35 U.S.C. 154(b) by 361 days.

(21) Appl. No.: 13/971,779

(22) Filed: Aug. 20, 2013

Related U.S. Application Data

(60) Provisional application No. 61/707,785, filed on Sep. 28, 2012.

(51) Int. Cl.
*H04L 29/06* (2006.01)
*H04L 12/26* (2006.01)

(52) U.S. Cl.
CPC .................. *H04L 65/403* (2013.01)

(58) Field of Classification Search
CPC ...................................... H04L 12/585
USPC ......................................... 709/204
See application file for complete search history.

(56) References Cited

U.S. PATENT DOCUMENTS

| | | | |
|---|---|---|---|
| 8,489,515 B2 * | 7/2013 | Mathur | G06F 17/30867 705/319 |
| 8,843,479 B1 | 9/2014 | Bharat et al. | |
| 8,918,404 B1 * | 12/2014 | Dachille | G06F 17/3089 707/748 |
| 8,990,951 B1 * | 3/2015 | Kruger | G06F 21/10 726/26 |
| 2008/0028294 A1 * | 1/2008 | Sell | G06F 17/30265 715/234 |
| 2008/0040474 A1 | 2/2008 | Zuckerberg et al. | |
| 2009/0158399 A1 * | 6/2009 | Cooley | G06F 21/31 726/4 |
| 2009/0164913 A1 * | 6/2009 | Davar | G06F 17/30861 715/751 |
| 2010/0198772 A1 | 8/2010 | Silverman et al. | |
| 2010/0205541 A1 | 8/2010 | Rapaport et al. | |
| 2010/0318418 A1 | 12/2010 | Wertheimer et al. | |
| 2011/0022589 A1 * | 1/2011 | Bauer | G06F 17/30855 707/723 |
| 2011/0137737 A1 | 6/2011 | Baird et al. | |
| 2011/0289139 A1 * | 11/2011 | McIntosh | H04N 21/252 709/203 |
| 2012/0158753 A1 * | 6/2012 | He | G06F 17/30867 707/752 |

(Continued)

*Primary Examiner* — Moustafa M Meky
*Assistant Examiner* — Sm Z Islam
(74) *Attorney, Agent, or Firm* — McDermott, Will & Emery LLP

(57) ABSTRACT

Systems and methods for increasing a visibility of a content item with a comment by a close contact are provided. In some aspects, a first content item is received. A ranking for the first content item in a stream for a viewing user is determined based on an upload time of the first content item. A comment for the first content item is received from a first user, where a predicted affinity level of the viewing user for the first user is within an affinity level range. In response to receiving the comment, the ranking for the first content item in the stream for the viewing user is updated based on an upload time of the comment. The stream is provided for the viewing user.

19 Claims, 7 Drawing Sheets

(56) References Cited

U.S. PATENT DOCUMENTS

| | | | |
|---|---|---|---|
| 2012/0166532 A1* | 6/2012 | Juan | G06Q 50/01 709/204 |
| 2012/0221581 A1* | 8/2012 | Narayanan | H04W 4/21 707/748 |
| 2012/0271831 A1 | 10/2012 | Narayanan et al. | |
| 2014/0013353 A1 | 1/2014 | Mathur | |
| 2014/0019446 A1 | 1/2014 | He et al. | |

* cited by examiner

INCREASING A VISIBILITY OF A CONTENT ITEM WITH A COMMENT BY A CLOSE CONTACT

CROSS REFERENCE TO RELATED APPLICATION

This application claims priority under 35 U.S. C. § 119(e) and the benefit of U.S. Provisional Application No. 61/707,785, filed Sep. 28, 2012, and entitled, "INCREASING A VISIBILITY OF A CONTENT ITEM WITH A COMMENT BY A CLOSE CONTACT," the entire disclosure of which is incorporated herein by reference.

BACKGROUND

The subject technology generally relates to social networking services and, in particular, relates to increasing a ranking of a content item with a comment by a close contact.

A social networking service may present, to a viewing user, a set of content items in a stream. The stream may be ranked according to a chronological order. However, the viewing user may be more interested in content items that have comments associated with the close social contacts (e.g., close friends or close family members) of the viewing user. Content items that have comments, for example by the close social contacts of the viewing user, tend to be older and, thus, may be ranked lower in the stream than other content items, preventing the viewing user from seeing or interacting with the content items having the comments by the close social contacts.

SUMMARY

In some innovative aspects, the disclosed subject matter relates to a computer-implemented method. The method includes receiving a first content item. The method includes determining a ranking for the first content item in a stream for a viewing user based on an upload time of the first content item. The method includes receiving a comment for the first content item from a first user, where a predicted affinity level of the viewing user for the first user is within an affinity level range. The method includes updating, in response to receiving the comment, the ranking for the first content item in the stream for the viewing user based on an upload time of the comment. The method includes providing the stream for the viewing user.

These and other embodiments can include one or more of the following features. Determining the ranking for the first content item includes applying a predetermined equation to the upload time of the first content item, and updating the ranking for the first content item includes applying the predetermined equation to the upload time of the comment. The predicted affinity level of the viewing user for the first user is determined based on stored indicia of interaction between the viewing user and the first user. The affinity level range corresponds to predicted affinity levels exceeding a threshold affinity level. The first content item comprises one or more of: a text post, an image, a video, a geographic check-in, an external link, or information related to an event. The stream includes plural content items arranged according to rankings of the plural content items. The plural content items are arranged into plural buckets, each content item in the plural content items being assigned to a bucket among the plural buckets based on a time associated with the content item and whether the viewing user has viewed the content item. The time associated with the content item corresponds to an upload time of the content item or an upload time of a comment for the content item, where the comment is by a second user, and where a predicted affinity level of the viewing user for the second user is within the affinity level range. The method also includes modifying, in response to receiving the comment, an assigned bucket for the first content item based on the upload time of the comment.

In some innovative aspects, the disclosed subject matter relates to a computer-readable medium encoded with executable instructions. The instructions include code for receiving a set of candidate content items for a stream for a viewing user, each candidate content item in the set being associated with a ranking. The instructions include code for selecting a first threshold number of the candidate content items from the set for presenting in the stream based on the associated rankings. The instructions include code for determining that one or more candidate content items in the set of candidate content items and not among the first threshold number of candidate content items have one or more comments associated with a close contact of the viewing user. The instructions include code for selecting a second threshold number of candidate content items from the one or more candidate content items for presenting in the stream based on the associated rankings. The instructions include code for providing the stream for the viewing user, the stream including content items among the first threshold number of the candidate content items and content items among the second threshold number of candidate content items.

These and other embodiments can include one or more of the following features. The set of candidate content items corresponds to content items meeting criteria. The criteria include one or more of a posting user of the candidate content items or a content type of the candidate content items. A predicted affinity level of the viewing user for the close contact is within an affinity level range. The affinity level range corresponds to predicted affinity levels exceeding a threshold affinity level. The predicted affinity level of the viewing user for the first user is determined based on stored indicia of interaction between the viewing user and the first user. The stored indicia of interaction comprise indicia of electronic messages.

In some innovative aspects, the disclosed subject matter relates to a system. The system includes one or more processors and a memory. The memory includes instructions executable by the one or more processors. The instructions include code for receiving a content item for a stream for a viewing user. The instructions include code for determining an audience size for the content item. The instructions include code for determining a predicted affinity level of the viewing user for a posting user of the content item. The instructions include code for determining a ranking for the content item in the stream based on a posting time of the content item, the audience size for the content item, and the predicted affinity level of the viewing user for the posting user. The instructions include code for providing the stream including the content item.

These and other embodiments can include one or more of the following features. The audience size includes a number of users with whom the posting user shared the content item. The audience size includes a number of followers of the posting user. Determining the ranking for the content item in the stream includes determining the ranking based on the posting time of the content item. Determining the ranking for the content item in the stream includes modifying the ranking determined based on the posting time in a case where the audience size is below a threshold audience size and the predicted affinity level is within an affinity level range. Determining the ranking for the content item in the stream includes foregoing modifying the ranking determined based on the posting time in a case where the audience size is above a threshold audience size or the predicted affinity level not within the affinity level range.

Advantageously, the subject technology provides for increasing a visibility of content item(s) in a social networking service that have comments by close social contacts of the viewing user. As a result, the viewing user is more likely to be interested in or to interact with the content item(s), increasing the engagement of the viewing user with the social networking service.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

Figure 1:
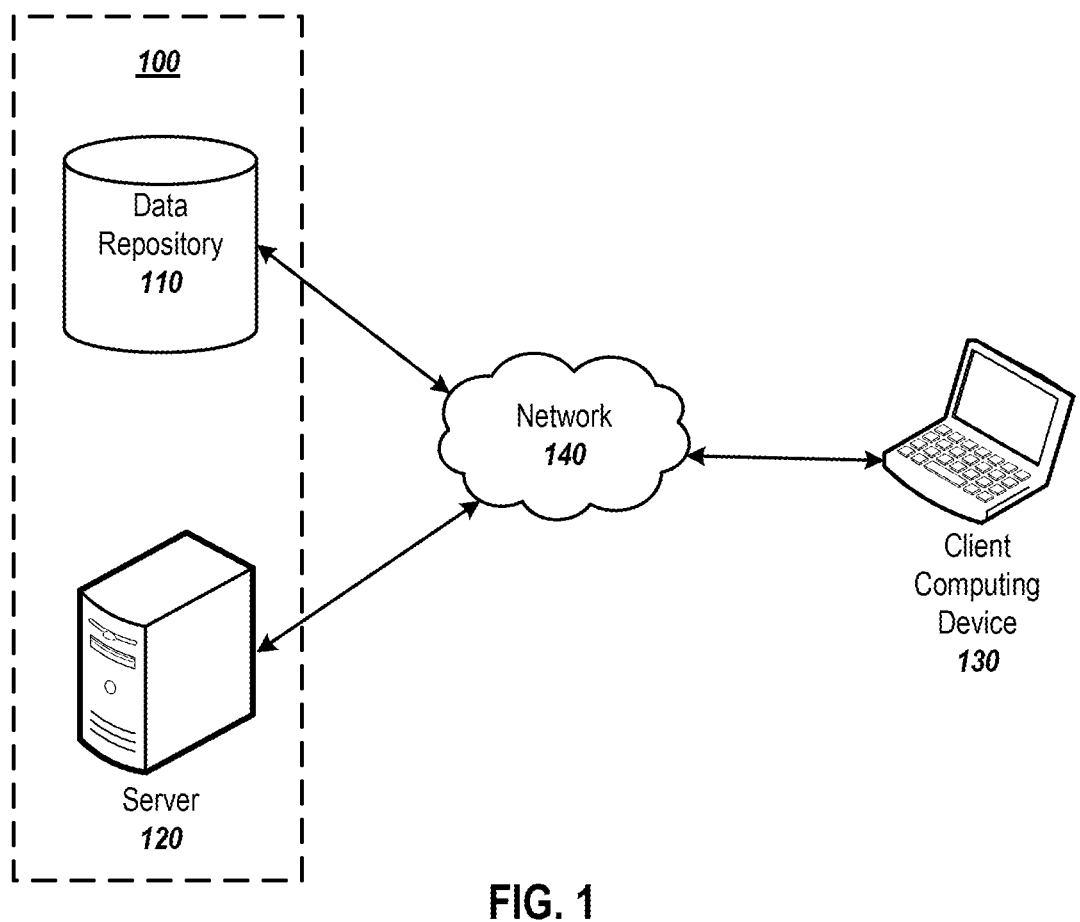
FIG. 1 illustrates an example of a system for increasing a visibility of a content item associated with a close contact of a viewing user.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology is not limited to the specific details set forth herein and may be practiced without these specific details. In some instances, structures and components are shown in block diagram form in order to avoid obscuring the concepts of the subject technology.

A new approach for ranking content items in a stream of a social networking service may be desirable. Specifically, an approach for increasing visibility of content item(s) that are of interest to a viewing user, for example, content item(s) that have comments by the close social contacts (e.g., close friends or family members) of the viewing user may be desirable. Visibility of a content item can be increased, for example, by placing the content item closer to a beginning of a stream or visually marking (e.g., highlighting, underlining, or placing in a box) the content item.

In some aspects, a server of a social networking service receives a first content item. The server determines a ranking for the first content item in a stream for a viewing user based on an upload time of the first content item. The server receives a comment for the first content item from a first user. A predicted affinity level of the viewing user for the first user exceeds a threshold affinity level. The server updates, in response to receiving the comment, the ranking for the first content item in the stream based on an upload time of the first comment. For example, if the ranking of content items in the stream is purely chronological, the ranking of the first content item can be updated from a ranking based on the upload time of the first content item to a ranking based on the upload time of the first comment. If additional comments from user(s) for whom the predicted affinity of the viewing user exceeds the threshold affinity level are received, the ranking for the first content item in the stream can be updated again. The server provides the stream for the viewing user. To ensure stability of the stream while the stream is being viewed, in some aspects, the first content item is not re-ranked while the stream is being displayed, even if additional comments from user(s) for whom the predicted affinity of the viewing user exceeds the threshold affinity level are received.

Some aspects of the subject technology include storing information about users of a social networking service. For example, a predicted affinity level of a first user for a second user, or an indication that the first user and the second user are close social contacts, may be stored. A user about whom information is stored has the option of removing such information from storage at the social networking service. A user affirmatively opts-in to having information about the user stored in the social networking service or the user can opt-out of having information about the user stored in the social networking service. In some aspects, a user is provided with reminders (e.g., when the user logs into the social networking service, every n logins to the social networking service, or every m days) that information about the user is stored. The reminders may be provided via the social networking service when the user accesses the social networking service or via an electronic messaging (e.g., email) address of the user.

As used herein, the term "stream," encompasses its plain and ordinary meaning including, but not limited to, for example, a feed of data (e.g., posts) by a user's social contacts that is presented to a user via a social networking service, for example, upon logging into a webpage or a mobile phone or tablet computer application of the social networking service.

FIG. 1 illustrates an example of a system 100 for increasing a visibility of a content item associated with a close contact of a viewing user. As shown, the system 100 includes a data repository 110 and a server 120. The data repository 110 and the server 120 communicate with one another and with and a client computing device 130 via a network 140. The network 140 may include the Internet, an intranet, a local area network, a wide area network, a wired network, a wireless network, or a virtual private network (VPN). While only one data repository 110, server 120, and client computing device 130 are illustrated, the subject technology may be implemented in conjunction with any number of data repositories 110, servers 120, or client computing devices 130. In some aspects, a single machine may implement the functions of two or more of the data repository 110, the server 120, or the client computing device 130.

The data repository 110 stores social content (e.g., posted content items) associated with the social networking service. One example of the data repository 110 is described in more detail in conjunction with FIG. 2 below.

The server 120 includes one or more modules for facilitating user interaction with the social networking service via a browser or a special purpose application executing on the client computing device 130. The server 120 may be implemented as a single machine with a single processor, a multi-processor machine, or a server farm including multiple machines with multiple processors. One example of the server 120 is described in more detail in conjunction with FIG. 3 below.

The client computing device 130 may be a laptop computer, a desktop computer, a mobile phone, a personal digital assistant (PDA), a tablet computer, a netbook, a television with one or more processors embedded therein or coupled thereto, a physical machine, or a virtual machine. The client computing device 130 may include one or more of a keyboard, a mouse, a display, or a touch screen. The client computing device 130 may also include a web browser configured to display webpages, for example a webpage of the social networking service. Alternatively, the client computing device 130 may include a special-purpose application (e.g., a mobile phone or tablet computer application) for accessing the social networking service.

Figure 2:
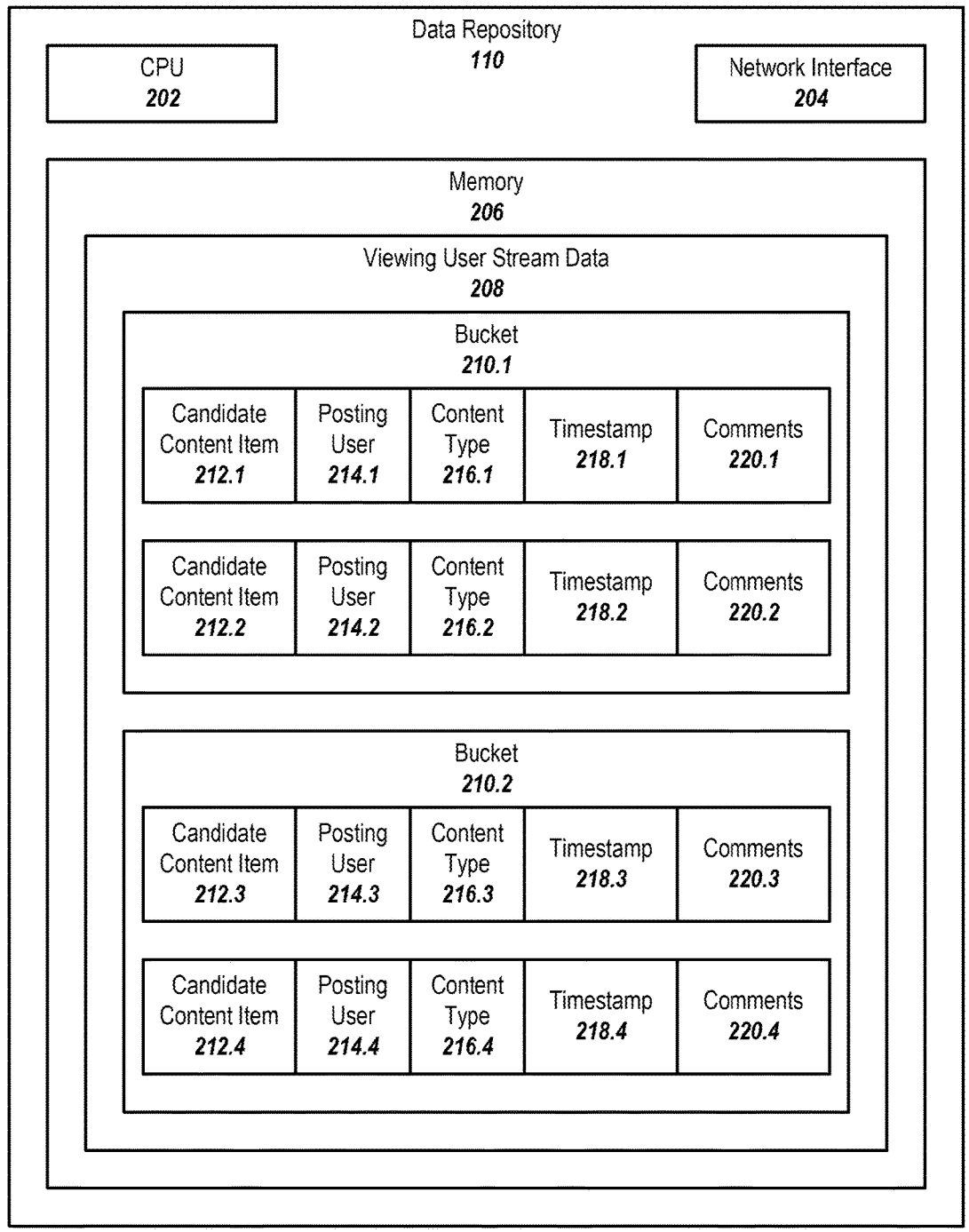
FIG. 2 illustrates an example of the data repository of FIG. 1.

FIG. 2 illustrates an example of the data repository 110 of FIG. 1. As shown, the data repository 110 includes a central processing unit (CPU) 202, a network interface 204, and a memory 206. The CPU 202 includes one or more processors. The CPU 202 is configured to execute computer instructions that are stored in a computer-readable medium, for example, the memory 206. The network interface 204 is configured to allow the data repository 110 to transmit and receive data in a network, e.g., network 140 of FIG. 1. The network interface 204 may include one or more network interface cards (NICs). The memory 206 stores data or instructions. The memory 206 may be one or more of a cache unit, a storage unit, an internal memory unit, or an external memory unit. As illustrated, the memory 206 includes viewing user stream data 208. While a single viewing user stream data 208 is shown in FIG. 2, the memory 206 can include stream data for multiple viewing users.

The viewing user stream data 208 includes candidate content items 212.1-4 for a stream for the viewing user that are separated into buckets 210.1-2. While two buckets 210.1-2 and four candidate content items 212.1-4 are illustrated, the subject technology may be implemented with any number of buckets or candidate content items. Furthermore, each bucket may include any number of candidate content items, not necessarily two candidate content items per bucket, as illustrated. The candidate content items 212.1-4 include content items that the viewing user has permission to view. All or a portion of the candidate content items 212.1-4 in the viewing user stream data 208 may be selected for placing in the stream based on, for example, a general interest level in the content items by members of the social networking service or an affinity of the viewing user for a posting user 214.$k$ of a candidate content item 212.$k$.

As used herein, the phrase "candidate content item" encompasses its plain and ordinary meaning including, but not limited to, a content item that a viewing user has permission (e.g., from a posting user or re-sharing user of the content item) to view and that is considered for inclusion in a stream for the viewing user. The candidate content item may or may not be selected for inclusion in the stream and may or may not be presented in the stream.

Each candidate content item 212.$k$ is associated with a posting user 214.$k$, a content type 216.$k$, a timestamp 218.$k$, and, in some cases, one or more comments 220.$k$. The posting user 214.$k$ is a user of the social networking service who uploaded the candidate content item to the social networking service. The content type 216.$k$ can be one or more of a text post, an image, a video, a geographic check-in, an external link, or information about an event. The timestamp 218.$k$ represents a time when the candidate content item 212.$k$ or a comment 220.$k$ about the candidate content item 212.$k$ was uploaded to the social networking service. The comments 220.$k$ include comments that are associated with or reference the content item 212.$k$ in the social networking service. A content item 212.$k$ can have no comments, a single comment, or multiple comments.

In some aspects, the candidate content items 212.1-4 are posted by social contacts of the viewing user. The candidate content items 212.1-4 are separated into buckets 210.1-2 based on whether the viewing user has previously viewed (e.g., scrolled over for a threshold time period, e.g., two seconds, or more) the candidate content items 212.1-4 and a time associated with the candidate content items 212.1-4 (e.g., a time when the candidate content item 212.$k$ was uploaded or a time when a comment for the candidate content item 212.$k$ was entered). The time associated with a candidate content item 212.$k$ is represented by timestamp 218.$k$. In some aspects, a first bucket 210.1 includes content items during a first time period before a current time (e.g., the last 24 hours or since the last login of the viewing user to the social networking service) that have not been viewed by the viewing user. A second bucket 210.2 includes content items during the first time period that have been viewed by the viewing user. A third bucket includes content items during a second time period (e.g., the prior 24 hours or since the prior login of the viewing user) before the first time period that have not been viewed by the viewing user. A fourth bucket includes content items during the second time period that have been viewed by the viewing user. Fifth, sixth, etc. buckets may be similarly defined. When presenting a stream, candidate content items 212.1-2 in the first bucket 210.1 may be presented closer to the beginning of a stream than candidate content items 212.3-4 in the second bucket 210.2, which may be presented closer to the beginning of the stream than candidate content items in the third bucket, etc.

Figure 3:
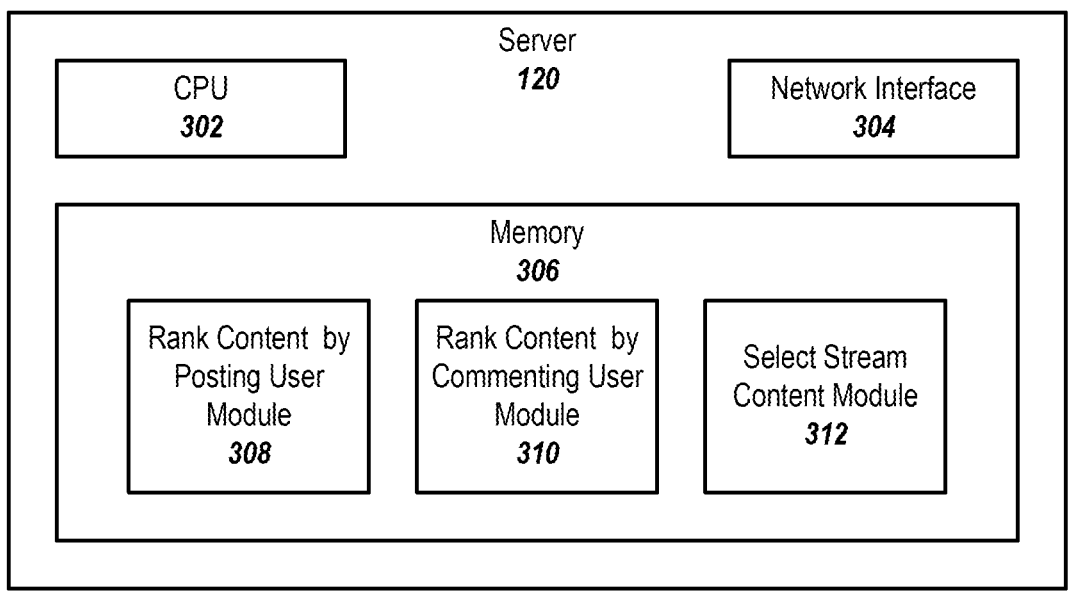
FIG. 3 illustrates an example of the server of FIG. 1.

FIG. 3 illustrates an example of the server 120 of FIG. 1. As shown, the server 120 includes a central processing unit (CPU) 302, a network interface 304, and a memory 306. The CPU 302 includes one or more processors. The CPU 302 is configured to execute computer instructions that are stored in a computer-readable medium, for example, the memory 306. The network interface 304 is configured to allow the server to transmit and receive data in a network, e.g., network 140 of FIG. 1. The network interface 304 may include one or more network interface cards (NICs). The memory 306 stores data or instructions. The memory 306 may be one or more of a cache unit, a storage unit, an internal memory unit, or an external memory unit. As illustrated, the memory 306 includes a rank content by posting user module 308, a rank content by commenting user module 310, and a select stream content module 312.

The rank content by posting user module 308 is configured to receive a content item (e.g., candidate content item 212.k) for a stream for a viewing user. The rank content item by posting user module 308 is configured to determine an audience size for the content item. The audience size can correspond to a number of users with whom the content item was shared or a number of followers of the posting user (e.g., posting user 214.k) of the content item. The rank content item by posting user module 308 is configured to determine a predicted affinity level of the viewing user for the posting user of the content item. The predicted affinity level can be determined based on a time decayed number or type of communication sessions between the posting user and the viewing user. For example, if the posting user and the viewing user communicated often in the recent past (e.g., more than 10 times in the last month), the posting user and the viewing user have a high predicted affinity level for one another. The rank content by posting user module 308 is configured to determine a ranking for the content item in the stream based on a posting time of the content item, the audience size of the content item, and the predicted affinity level of the viewing user for the posting user. A content item may be assigned a higher ranking if the content item has a more recent posting time, a smaller audience size, and a higher predicted affinity level of the viewing user for the posting user. The rank content by posting user module 308 is configured to provide the stream including the content item. The content item has a position in the stream determined based on the ranking. One example of an operation of the rank content by posting user module 308 is described below in conjunction with FIG. 6.

The rank content by commenting user module 310 is configured to receive a first content item (e.g., candidate content item 212.k). The rank content by commenting user module 310 is configured to determine a ranking for the first content item in a stream for a viewing user based on an upload time (e.g., represented as timestamp 218.k) of the first content item. The rank content by commenting user module 310 is configured to receive a comment for the first content item from a first user. A predicted affinity level of the viewing user for the first user is within an affinity level range. For example, the predicated affinity level may exceed a threshold affinity level, indicating that the viewing user is close to or interested in the first user. The rank content by commenting user module 310 is configured to update, in response to receiving the comment, the ranking for the first content item in the stream for the viewing user based on an upload time of the comment. For example, if the ranking is a function of a timestamp (e.g., timestamp 218.k), the timestamp may be changed from corresponding to the upload time of the first content item to corresponding to the upload time of the comment. The rank content by commenting user module 310 is configured to provide the stream for the viewing user (e.g., to a client computing device accessing an account of the viewing user in a social networking service). A position of the first content item in the stream is determined based on the ranking. One example of an operation of the rank content by commenting user module 310 is described below in conjunction with FIG. 4.

The select stream content module 312 is configured to receive a set of candidate content items for a stream for a viewing user. Each candidate content item in the set is associated with a ranking. The set can correspond to all content items viewable by the viewing user, a bucket (e.g., bucket 210.k) of content items viewable to the user, or content items viewable to the viewing user having common characteristics (e.g., geographic check-ins by social contacts of the viewing user or content items posted by a specific posting user 214.k). The select stream content module 312 is configured to select a first threshold number of the candidate content items from the set for presenting in the stream based on the associated rankings. For example, the first threshold number of highest-ranked candidate content items may be selected. The set of candidate content items may include more than the first threshold number of candidate content items. For example, the first threshold number may be five and the set may include 100 content items.

The select stream content module 312 is configured to determine that one or more candidate content items in the set of candidate content items and not among the first threshold number of candidate content items (that were already selected for presenting in the stream) have one or more comments associated with a close social contact of the viewing user. A close social contact of the viewing user may be a social contact of the viewing user for whom the viewing user has an affinity level exceeding a threshold affinity level or a social contact whom the viewing user indicated to the social network is close to the viewing user (e.g., whom the viewing user identified as a close friend or close family member). The select stream content module 312 is configured to select a second threshold number of candidate content items from the one or more candidate content items (that have a comment associated with a close social contact) for presenting in the stream based on the associated rankings. For example, the two additional candidate content items that have a comment associated with a close social contact and the highest rankings may be selected. The select stream content module 312 is configured to provide the stream for the viewing user. The stream includes content items among the first threshold number of candidate content items and content items among the second threshold number of candidate content items. One example of an operation of the select stream content module 312 is described below in conjunction with FIG. 5.

Figure 4:
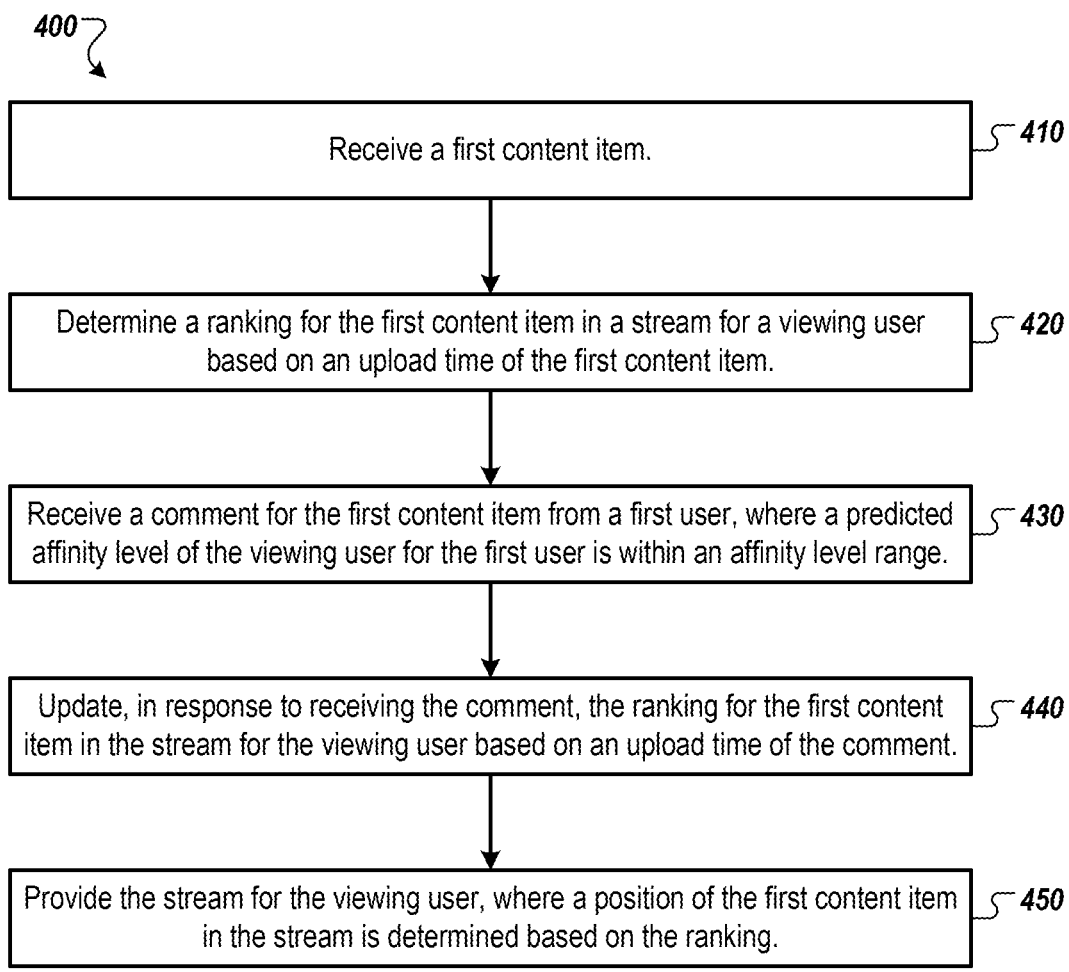
FIG. 4 illustrates an example process by which a ranking of a content item may be updated in response to receiving a comment.

FIG. 4 illustrates an example process 400 by which a ranking of a content item may be updated in response to receiving a comment.

The process 400 begins at step 410, where a server (e.g., server 120) receives a first content item. The first content item may be received for presenting in a stream for a viewing user of a social networking service.

In step 420, the server determines a ranking for the first content item in a stream for the viewing user based on an upload time of the first content item. For example, the server applies a predetermined equation to the upload time of the first content item: ranking=f (upload time of first content item), where f represents the predetermined equation.

In step 430, the server receives a comment for the first content item from a first user. A predicted affinity level of the viewing user for the first user is within an affinity level range. For example, the predicted affinity level may exceed an affinity level threshold. The predicted affinity level may be determined based on a time-decayed number and type (e.g., common geographic check-in, exchange of electronic messages, telephone conversation, etc.) of interactions between the viewing user and the first user. With appropriate permissions from the viewing user and the first user, indicia of these interactions may be stored by the social networking service, for example, at the server or at a data repository. Alternatively, the viewing user may indicate to the social networking service that the first user is a close friend or close family member of the viewing user, resulting in increasing of the predicted affinity level of the viewing user for the first user.

In step 440, the server updates, in response to receiving the comment, the ranking for the first content item in the stream for the viewing user based on an upload time of the comment. For example, the server may apply the predetermined equation (described in conjunction with step 420) to the upload time for the comment: updated ranking=f (upload time of comment), where f represents the predetermined equation. In some aspects, the content items in the stream are arranged in buckets based on an associated timestamp. A bucket of the first content item may be modified, in response to receiving the comment, to a new assigned bucket corresponding to the upload time of the comment.

In some aspects, if additional comments are uploaded (e.g., by additional user(s) for whom the viewing user has an affinity level within the affinity level range, the server again updates the ranking for the first content item in the stream for the viewing user based on an upload time of the additional comment(s), or based on the upload time for the latest additional comment.

In step 450, the server provides the stream for the viewing user. A position of the first content item in the stream is determined based on the ranking. For example, all or a portion (e.g., a bucket) of the content items in the stream may be arranged according to rankings of the content items in the stream. The stream can include multiple content items. After step 450, the process 400 ends.

Figure 5:
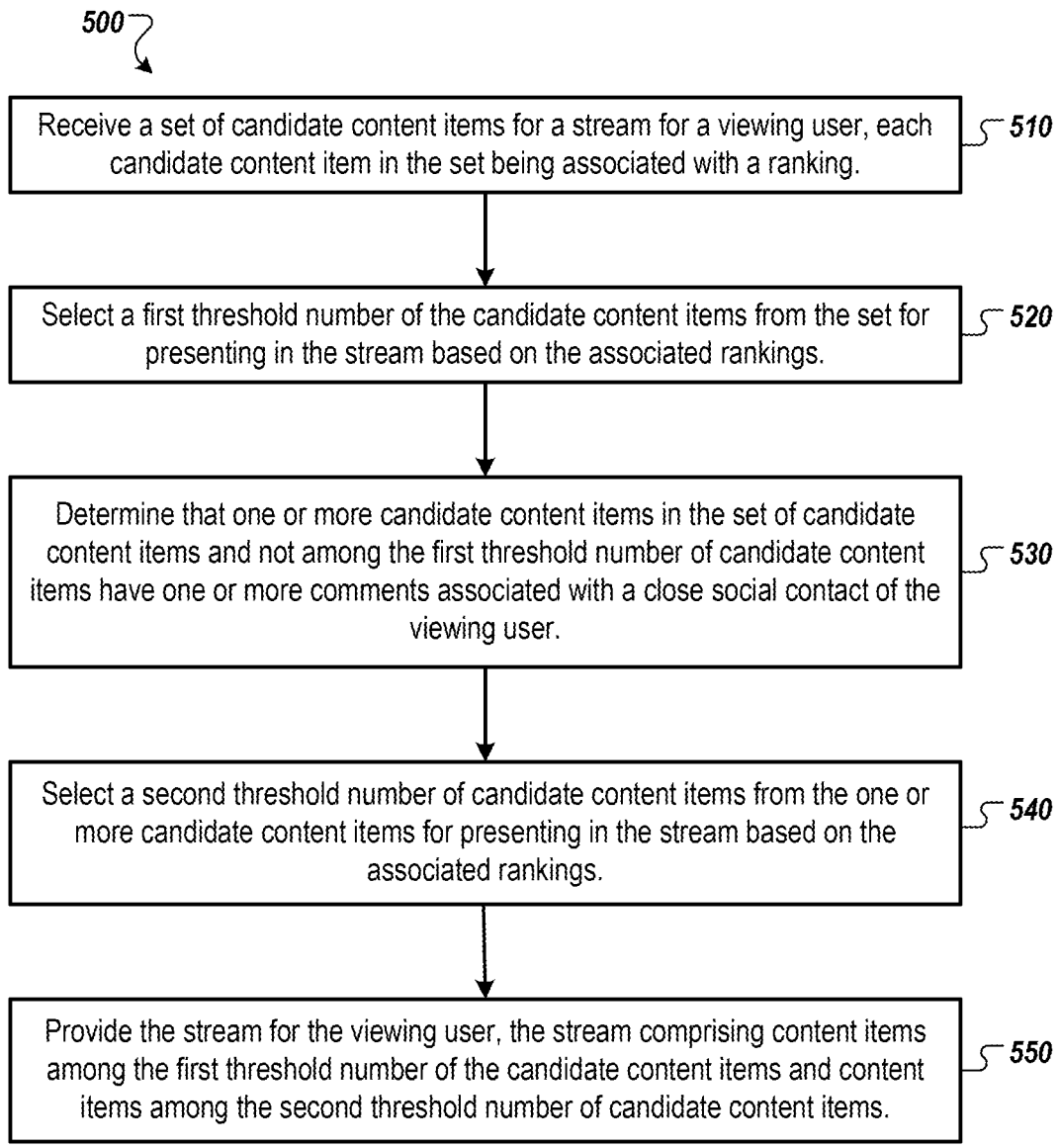
FIG. 5 illustrates an example process by which content items may be selected for presenting in a stream.

FIG. 5 illustrates an example process 500 by which content items may be selected for presenting in a stream.

The process 500 begins at step 510, where a server (e.g., server 120) receives a set of candidate content items for a stream of a viewing user. Each candidate content item in the set is associated with a ranking. The candidate content items may be in the same bucket or may all be associated with a common characteristic or meeting common criteria (e.g., the candidate content items are all text posts or the candidate content items are all by the same posting user). The criteria can includes a posting user of the candidate content items or a content type of the candidate content items. The content type can be one or more of a text post, an image, a video, a geographic check-in, an external link, or information about an event.

In step 520, the server selects a first threshold number of candidate content items from the set for presenting in the stream based on the associated rankings. For example, the server may select the five highest ranked candidate content items from the set.

In step 530, the server determines that one or more candidate content items in the set of candidate content items and not among the first threshold number of candidate content items (e.g., candidate content item(s) that were not selected in step 520) have one or more comments associated with a close social contact of the viewing user. A member of the social networking service who is a close social contact of the viewing user may be identified based on the viewing user's disclosure to the social networking service that the member is the viewing user's close social contact. Alternatively, the server can predict an affinity level of the viewing user for the member based on a time-decayed number of interactions (e.g., text, audio, or video chat sessions, electronic communication within or external to the social networking service, common presence at event(s), common geographic check-ins, etc.) between the viewing user and the member. The member may be a close social contact of the viewing user if the predicted affinity level falls within a range (e.g., exceeds a threshold affinity level). With appropriate permissions from the viewing user and the member, indicia of the interactions may be stored by the social networking service at a server or a data repository. The interactions may be internal to the social networking service (e.g., a chat session within the social networking service) or external to the social networking service (e.g., electronic message, e.g., email, communications external to the social networking service). The viewing user and the member opt-in to having the social networking service determine their close social contacts or can opt-out of having the social networking service determine their close social contacts.

In step 540, the server selects a second threshold number of candidate content items from the one or more candidate content items (e.g., which have one or more comments associated with the close social contact of the viewing user) for presenting in the stream based on the associated rankings. For example, the server can select the two comments which have the highest rankings and which have one or more comments associated with the close social contact of the viewing user.

In step 550, the server provides the stream for the viewing user. The stream includes content items among the first threshold number of the candidate content items and content items among the second threshold number of candidate content items. After step 550, the process 500 ends.

One example of the process 500 is illustrated as follows. Suppose a bucket contains 10 candidate content items: A, B, C, D, E, F, G, H, I, and J, ranked alphabetically, with A having the highest ranking and J having the lowest ranking. Posts C, G, H, and J have comments by close social contacts of the viewing user. The first threshold number is 5 and the second threshold number is 2. In step 520, the five highest ranked candidate content items—A, B, C, D, and E—are selected for the stream. In step 530, candidate content items G, H, and J are identified as the one or more content items having comments by close social contacts of the viewing user. In step 540, the highest ranked two of the one or more candidate content items having comments by close social contacts of the viewing user—G and H—are selected for the stream. As a result, the stream will contain the candidate content items A, B, C, D, E, G, and H, but not F, I, and J. It should be noted that F is ranked higher than G and H, but is not selected for the stream because F does not have a comment by a close social contact of the viewing user.

Figure 6:
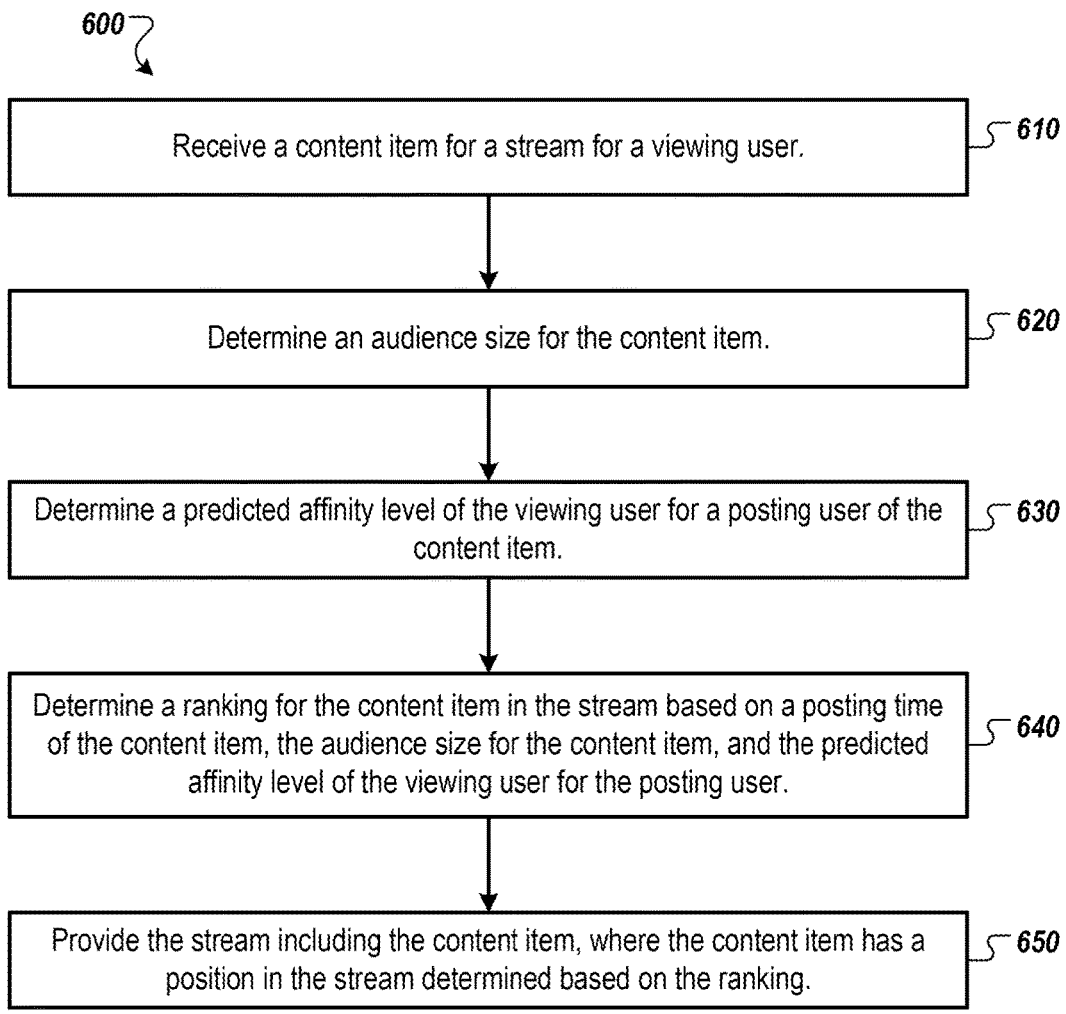
FIG. 6 illustrates an example process by which a ranking of a content item in a stream may be determined.

FIG. 6 illustrates an example process 600 by which a ranking of a content item in a stream may be determined.

The process 600 begins at step 610, where a server (e.g., server 120) receives a content item for a stream of a viewing user.

In step 620, the server determines an audience size for the content item. In some aspects, the audience size corresponds to a number of users with whom a posting user of the content item shared the content item. In some aspects, for example, if the content item is shared publically, the audience size corresponds to a number of followers of the posting user.

In step 630, the server determines a predicted affinity level of the viewing user for the posting user of the content item.

In step 640, the server determines a ranking for the content item in the stream based on a posting time of the content item, the audience size of the content item, and the predicted affinity level of the viewing user for the posting user. In some aspects, higher ranked items have a later posting time, a smaller audience size, and a greater predicted affinity level. In some aspects, the server first determines a ranking based on the posting time for the content item. If the audience size is below a threshold audience size and the predicated affinity level is within an affinity level range (e.g., exceeding a threshold affinity level), the ranking is modified (e.g., increased). Otherwise, the server foregoes modifying the ranking.

In step 650, the server provides the stream including the content item, for example, to a client computing device accessing an account in the social networking service of the viewing user. The content item has a position in the stream determined based on the ranking. After step 650, the process 600 ends.

FIGS. 4-6 illustrate example processes of the subject technology being carried out in serial processing in a certain order. However, the steps of the processes 400, 500, or 600 can be carried out in any order. In some aspects, two or more of the steps of the processes 400, 500, or 600 are carried out in parallel.

Example approaches for ranking content items in a stream (e.g., of a social networking service) are described above. However, other approaches for ranking content items in the stream may also be used in conjunction with the subject technology. For example, content items in a stream may be ranked based on the number of comments, endorsements, or re-shares the content items receive. In some aspects, the number of comments, endorsements, or re-shares for a specific content item may be weighted against the number of users who saw (e.g., scrolled through) the content item. For example, a content item that was commented on by 9 users and seen by 10 users may receive a higher ranking than a content time that was commented on by 11 users and seen by 100 users. In some aspects, the number of users who have seen a content item may be difficult to accurately determine and another value (e.g., a maximum possible audience size or an amount of time elapsed since posting of the content item) may be used in place of the number of users who have seen the content item.

Figure 7:
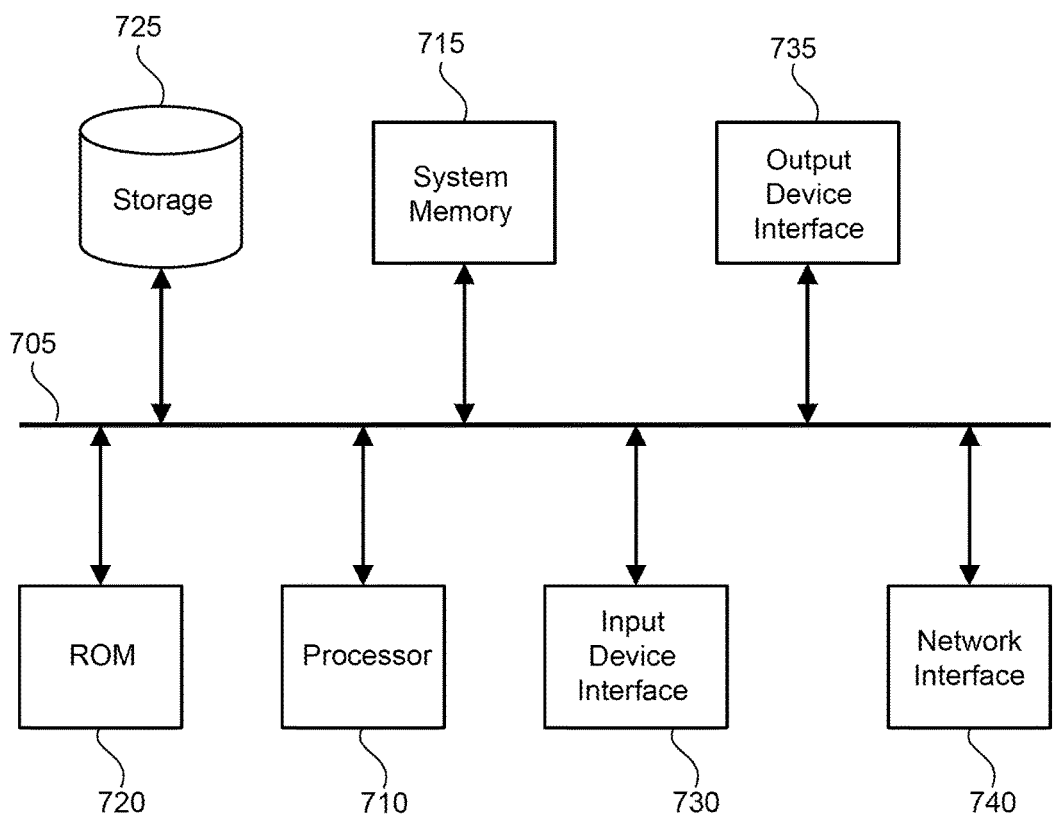
FIG. 7 conceptually illustrates an example electronic system with which some implementations of the subject technology are implemented.

FIG. 7 conceptually illustrates an electronic system 700 with which some implementations of the subject technology are implemented. For example, one or more of the data repository 110, the server 120, or the client computing device 130 may be implemented using the arrangement of the electronic system 700. The electronic system 700 can be a computer (e.g., a mobile phone, PDA), or any other sort of electronic device. Such an electronic system includes various types of computer readable media and interfaces for various other types of computer readable media. Electronic system 700 includes a bus 705, processing unit(s) 710, a system memory 715, a read-only memory 720, a permanent storage device 725, an input device interface 730, an output device interface 735, and a network interface 740.

The bus 705 collectively represents all system, peripheral, and chipset buses that communicatively connect the numerous internal devices of the electronic system 700. For instance, the bus 705 communicatively connects the processing unit(s) 710 with the read-only memory 720, the system memory 715, and the permanent storage device 725.

From these various memory units, the processing unit(s) 710 retrieves instructions to execute and data to process in order to execute the processes of the subject technology. The processing unit(s) can be a single processor or a multi-core processor in different implementations.

The read-only-memory (ROM) 720 stores static data and instructions that are needed by the processing unit(s) 710 and other modules of the electronic system. The permanent storage device 725, on the other hand, is a read-and-write memory device. This device is a non-volatile memory unit that stores instructions and data even when the electronic system 700 is off. Some implementations of the subject technology use a mass-storage device (for example a magnetic or optical disk and its corresponding disk drive) as the permanent storage device 725.

Other implementations use a removable storage device (for example a floppy disk, flash drive, and its corresponding disk drive) as the permanent storage device 725. Like the permanent storage device 725, the system memory 715 is a read-and-write memory device. However, unlike storage device 725, the system memory 715 is a volatile read-and-write memory, such a random access memory. The system memory 715 stores some of the instructions and data that the processor needs at runtime. In some implementations, the processes of the subject technology are stored in the system memory 715, the permanent storage device 725, or the read-only memory 720. For example, the various memory units include instructions for increasing a visibility of a content item with a comment by a close social contact in accordance with some implementations. From these various memory units, the processing unit(s) 710 retrieves instructions to execute and data to process in order to execute the processes of some implementations.

The bus 705 also connects to the input and output device interfaces 730 and 735. The input device interface 730 enables the user to communicate information and select commands to the electronic system. Input devices used with input device interface 730 include, for example, alphanumeric keyboards and pointing devices (also called "cursor control devices"). Output device interfaces 735 enables, for example, the display of images generated by the electronic system 700. Output devices used with output device interface 735 include, for example, printers and display devices, for example cathode ray tubes (CRT) or liquid crystal displays (LCD). Some implementations include devices for example a touch screen that functions as both input and output devices.

Finally, as shown in FIG. 7, bus 705 also couples electronic system 700 to a network (not shown) through a network interface 740. In this manner, the electronic system 700 can be a part of a network of computers (for example a local area network ("LAN"), a wide area network ("WAN"), or an Intranet, or a network of networks, for example the Internet. Any or all components of electronic system 700 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method comprising:
   receiving a first content item;
   determining a ranking for the first content item in a stream for a viewing user based on an upload time of the first content item, the stream comprising plural content items;
   receiving a comment for the first content item from a first user;
   determining that a predicted affinity level of the viewing user for the first user is within an affinity level range;
   updating, in response to receiving the comment and the determination that the predicted affinity level is within the affinity level range, the ranking for the first content item in the stream for the viewing user based on an upload time of the comment and the predicted affinity level of the viewing user for the first user providing the comment; and
   providing the stream for the viewing user based on the updated ranking of the first content item,
   wherein the predicted affinity level of the viewing user for the first user is determined based on stored indicia of interaction between the viewing user and the first user.

2. The method of claim 1, wherein determining the ranking for the first content item comprises applying a predetermined equation to the upload time of the first content item, and wherein updating the ranking for the first content item comprises applying the predetermined equation to the upload time of the comment.

3. The method of claim 1, wherein the affinity level range corresponds to predicted affinity levels exceeding a threshold affinity level.

4. The method of claim 1, wherein the first content item comprises one or more of: a text post, an image, a video, a geographic check-in, an external link, or information related to an event.

5. The method of claim 1, wherein the plural content items are arranged into plural buckets, each content item in the plural content items being assigned to a bucket among the plural buckets based on a time associated with the content item and whether the viewing user has viewed the content item.

6. The method of claim 5, wherein the time associated with the content item corresponds to an upload time of the content item or an upload time of a comment for the content item, wherein the comment is by a second user, and wherein a predicted affinity level of the viewing user for the second user is within the affinity level range.

7. The method of claim 6, further comprising:
   modifying, in response to receiving the comment, an assigned bucket for the first content item based on the upload time of the comment.

8. The method of claim 1, further comprising:
   determining that the first content item is not being viewed by the viewing user,
   wherein updating the ranking is further in response to the determination that the first content item is not being viewed by the viewing user.

9. The method of claim 1, wherein determining the ranking for the first content item is further based on endorsements or re-shares of the content item.

10. A computer-readable medium comprising instructions which, when executed by one or more computers, cause the one or more computers to implement a method, the method comprising:
    receiving a set of candidate content items for a stream for a viewing user, each candidate content item in the set being associated with a ranking;
    selecting a first threshold number of the candidate content items from the set for presenting in the stream based on the associated rankings;
    determining that one or more candidate content items in the set of candidate content items and not among the first threshold number of candidate content items have one or more comments associated with a close contact of the viewing user;
    selecting a second threshold number of candidate content items from the one or more candidate content items for presenting in the stream based on the associated rankings and on whether the one or more candidate content items have one or more comments associated with the close contact of the viewing user, the close contact being identified for the viewing user based on a predicted affinity level of the viewing user for the close contact determined based on stored indicia of interaction between the viewing user and the close contact; and
    providing the stream for the viewing user, the stream comprising content items among the first threshold number of the candidate content items and content items among the second threshold number of candidate content items.

11. The computer-readable medium of claim 10, wherein the set of candidate content items corresponds to content items meeting criteria.

12. The computer-readable medium of claim 11, wherein the criteria comprise one or more of a posting user of the candidate content items or a content type of the candidate content items.

13. The computer-readable medium of claim 10, wherein the predicted affinity level of the viewing user for the close contact is within an affinity level range.

14. The computer-readable medium of claim 13, wherein the affinity level range corresponds to predicted affinity levels exceeding a threshold affinity level.

15. The computer-readable medium of claim 10, wherein the stored indicia of interaction comprise indicia of electronic messages.

16. A system comprising:
    one or more processors; and a memory comprising instructions which, when executed by the one or more processors, cause the one or more processors to implement a method, the method comprising:

receiving a content item for a stream for a viewing user;

determining an audience size for the content item;

determining a predicted affinity level of the viewing user for a posting user of the content item;

determining a ranking for the content item in the stream based on a posting time of the content item, the audience size for the content item, and the predicted affinity level of the viewing user for the posting user of the content item; and providing the stream comprising the content item, wherein the predicted affinity level of the viewing user for the posting user is determined based on stored indicia of interaction between the viewing user and the posting user.

17. The system of claim 16, wherein the audience size comprises a number of users with whom the posting user shared the content item.

18. The system of claim 16, wherein the audience size comprises a number of followers of the posting user.

19. The system of claim 16, wherein determining the ranking for the content item in the stream comprises:

determining the ranking based on the posting time of the content item;

modifying the ranking determined based on the posting time in a case where the audience size is below a threshold audience size and the predicted affinity level is within an affinity level range; and foregoing modifying the ranking determined based on the posting time in a case where the audience size is above a threshold audience size or the predicted affinity level not within the affinity level range.

* * * * *